(12) United States Patent
Czapla et al.

(10) Patent No.: US 12,172,764 B2
(45) Date of Patent: Dec. 24, 2024

(54) REINFORCED LATTICE STRUCTURE AND AIRCRAFT COMPRISING AT LEAST ONE SUCH STRUCTURE

(71) Applicant: AIRBUS OPERATIONS (S.A.S.), Toulouse (FR)

(72) Inventors: Lionel Czapla, Toulouse (FR); Kotaro Fukasaku, Toulouse (FR); Emmanuel Vardelle, Toulouse (FR); Rémi Amargier, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 1 day.

(21) Appl. No.: 18/346,528

(22) Filed: Jul. 3, 2023

(65) Prior Publication Data
US 2024/0002064 A1 Jan. 4, 2024

(30) Foreign Application Priority Data

Jul. 4, 2022 (FR) ...................... 2206756

(51) Int. Cl.
*B64D 27/40* (2024.01)
*F01D 25/28* (2006.01)
*F02C 7/20* (2006.01)

(52) U.S. Cl.
CPC ........... *B64D 27/40* (2024.01); *B64D 27/402* (2024.01); *B64D 27/406* (2024.01); *F01D 25/28* (2013.01);
(Continued)

(58) Field of Classification Search
CPC .... B64D 27/40; B64D 27/402; B64D 27/406; B64D 27/404; F01D 25/28; F02C 7/20;
(Continued)

(56) References Cited

U.S. PATENT DOCUMENTS

| | | | |
|---|---|---|---|
| 2010/0170980 A1* | 7/2010 | Haramburu ............ | B64D 27/40 244/54 |
| 2015/0336678 A1* | 11/2015 | Cassagne .............. | F16C 23/046 244/54 |

(Continued)

FOREIGN PATENT DOCUMENTS

| | | |
|---|---|---|
| EP | 1712466 A1 | 10/2006 |
| FR | 2916424 A1 | 11/2008 |

(Continued)

OTHER PUBLICATIONS

Search Report for FR Application No. 2206756 dated Feb. 20, 2023, 2 pages.

*Primary Examiner* — Gerald L Sung
*Assistant Examiner* — Rene D Ford
(74) *Attorney, Agent, or Firm* — Nixon & Vanderhye P.C.

(57) ABSTRACT

A structure for an aircraft is disclosed including comprising at least one node which having first and second plates which are pressed against two opposite faces of a first reinforcement, and to which upstream and downstream reinforcements positioned on either side of the first reinforcement are connected. A connection system connecting the first and second plates is disclosed including at least one boss projecting from a surface of one of the plates pressed against the first reinforcement, for each boss, a housing recessed relative to a surface of the other plate pressed against the first reinforcement, configured to house the boss, and at least one fastening element, passing through the first reinforcement, connecting the first and second plates and spaced apart from the boss.

8 Claims, 7 Drawing Sheets

(52) U.S. Cl.
CPC .............. *B64D 27/404* (2024.01); *F02C 7/20* (2013.01); *F05D 2230/64* (2013.01); *F05D 2240/90* (2013.01); *F05D 2260/31* (2013.01); *F05D 2260/36* (2013.01)

(58) Field of Classification Search
CPC ............. F05D 2230/64; F05D 2240/90; F05D 2260/31; F05D 2260/36
See application file for complete search history.

(56) References Cited

U.S. PATENT DOCUMENTS

| | | | |
|---|---|---|---|
| 2016/0159487 A1* | 6/2016 | Kang ..................... | B64D 27/18 244/54 |
| 2016/0280381 A1* | 9/2016 | Zameroski .......... | G06F 11/3433 |
| 2018/0148186 A1* | 5/2018 | Bouchet ................. | G01K 1/20 |
| 2018/0186462 A1 | 7/2018 | Brochard | |
| 2019/0009918 A1* | 1/2019 | Zameroski ............. | B64D 27/40 |
| 2019/0168861 A1* | 6/2019 | Fotouhie .............. | B64D 27/406 |
| 2022/0371743 A1* | 11/2022 | Allain .................... | B64D 37/30 |
| 2023/0084689 A1* | 3/2023 | Piard ........................ | F02C 7/24 403/326 |
| 2023/0192306 A1* | 6/2023 | Matson ................ | B64D 27/402 244/54 |

FOREIGN PATENT DOCUMENTS

| | | |
|---|---|---|
| FR | 3096346 A1 | 11/2020 |
| WO | 2015074043 A2 | 5/2015 |

* cited by examiner

REINFORCED LATTICE STRUCTURE AND AIRCRAFT COMPRISING AT LEAST ONE SUCH STRUCTURE

CROSS REFERENCE TO RELATED APPLICATION

This application claims priority to and incorporates by reference French Application Number FR 2206756, filed Jul. 4, 2022.

BACKGROUND

The present application relates to a reinforced lattice structure and to an aircraft comprising at least one such structure.

According to one embodiment shown in FIG. 1, an aircraft 10 comprises a fuselage 12, wings 14 connected to the fuselage 12 and propulsion assemblies 16 connected to the wings 14 by structures 18 (visible in FIG. 2), each of which transmits forces (in particular thrust forces) between a propulsion assembly 16 and a wing 14.

According to a configuration shown in FIG. 2, the structure 18 is a lattice structure comprising frames 20, cylindrical reinforcements 22, 22', and nodes 24 distributed over the frames 20 and at each of which a plurality of cylindrical reinforcements 22, 22', positioned on either side of a frame 20, converge and are connected to each other and to the frame 20.

According to one embodiment shown in FIG. 3, at each node 24, the frame 20 has a first face F20 oriented towards at least one upstream cylindrical reinforcement 22 and a second face F20' oriented towards at least one downstream cylindrical reinforcement 22'. The node 24 comprises, upstream, a cylindrical body 26 which extends between first and second transverse faces F26, F26', and two upstream cylindrical reinforcements 22 forming a V, the tip of which is integral with the cylindrical body 26. In operation, the first transverse face F26 is pressed against the first face F20 of the frame 20. The node 24 also comprises, downstream, a plate 28 having a contact face F28 pressed against the second face F20' of the frame 20, and two downstream cylindrical reinforcements 22' forming a V, the tip of which is integral with the plate 28.

The plate 28 comprises a cylindrical boss 30 protruding from the contact face F28, and a tapped hole 32, passing through the boss 30 and the plate 28, substantially coaxial with the boss 30. In addition, the cylindrical body 26 comprises a through hole 34, opening at the level of the first and second transverse faces F26, F26', which has an enlarged mouth at the level of the first transverse face F26 to house part of the boss 30.

In line with each node 24, the frame 20 has a through hole 36, the diameter of which is adjusted to that of the boss 30. Lastly, each node 24 comprises a screw 38, which has a head 38.1 bearing against the second transverse face F26' of the cylindrical body 26 and a threaded shank 38.2 housed in the through hole 34 and screwed into the tapped hole 32.

In the event of the screw 38 breaking due, for example, to excessive stress, the node 24 is destroyed and the connections between the upstream and downstream cylindrical reinforcements 22, 22' and the frame 20 are broken. Consequently, all the other elements of the structure 18 are overdimensioned to absorb the additional forces generated by the loss of the node 24.

This embodiment of the nodes 24 results in a high mass due to the increase in the diameter or thickness of the cylindrical reinforcements used to make the structure 18.

SUMMARY

The present disclosure aims to remedy some or all of the disadvantages of the prior art.

The claimed invention encompasses a structure comprising at least one first reinforcement having first and second opposite faces, at least one node positioned on the first reinforcement, at least one upstream reinforcement and at least one downstream reinforcement which are positioned on either side of the first reinforcement and converge towards the node, the node comprising:
  a. a first plate, having a first surface pressed against the first face of the first reinforcement, to which the upstream reinforcement is connected,
  b. a second plate, having a first surface pressed against the second face of the first reinforcement, to which the downstream reinforcement is connected,
  c. a connection system comprising:
    i. at least one boss protruding from the first surface of a first element from among the first or second plate,
    ii. for each boss, a housing recessed relative to the first surface of a second element, different from the first element, from among the first or second plate, said housing being configured to house the boss,
    iii. an orifice passing through the first reinforcement for each boss,
    iv. at least one fastening element passing through the first reinforcement and connecting the first and second plates.

According to an exemplary embodiment, each fastening element is spaced apart from the boss.

Taking into account this arrangement, with equivalent cross section, the boss has a diameter smaller than that of a boss of the prior art since it is not passed through by a tapped hole. Thus, the other elements of the node, in particular the first and second plates, have dimensions smaller than those of the nodes of the prior art, resulting in a lighter and less costly structure with equivalent mechanical strength compared to a structure of the prior art.

According to an exemplary embodiment, the connection system comprises a plurality of fastening elements evenly distributed around the boss.

According to an exemplary embodiment, the first and second plates comprise identical first and second contours.

According to an exemplary embodiment, the first and second contours of the first and second plates have a protrusion for each fastening element.

According to an exemplary embodiment, the boss and the housing have cross sections adjusted so that the first and second plates are immobilized relative to each other in a plane parallel to the first or second face of the first reinforcement.

According to an exemplary embodiment, the first reinforcement, the boss, and the housing are configured so that the boss comprises a segment which is positioned in the housing and has a length greater than 0.25 times the diameter of the boss.

According to an exemplary embodiment, each fastening element has a shank passing through at least the first reinforcement and oriented perpendicularly to the first or second face of the first reinforcement.

According to an exemplary embodiment, the shank is configured to ensure optimal reaction of tensile forces. In addition, the shank and at least one smooth through hole housing it are dimensioned so that a clearance remains between the shank and the smooth through hole.

According to an exemplary embodiment, the boss has constant cross sections in planes parallel to the first or second face of the first reinforcement.

According to an exemplary embodiment, an aircraft is disclosed comprising at least one propulsion assembly, at least one support, and a structure according to one of the preceding features connecting the propulsion assembly and the support.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

An aircraft comprises at least one propulsion assembly, at least one support, such as the structure of a wing, and a structure connecting the propulsion assembly and the support. This structure is a lattice structure and comprises at least one first reinforcement 40, at least one node 42 positioned on the first reinforcement 40, at least one upstream reinforcement 44 and at least one downstream reinforcement 44 which converge towards the node 42.

Figure 1:
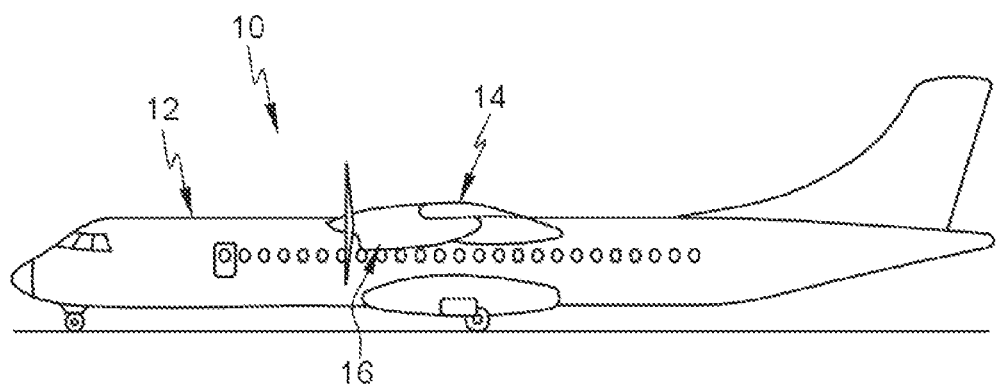
FIG. 1 is a side view of an aircraft depicting one embodiment.
Figure 2:
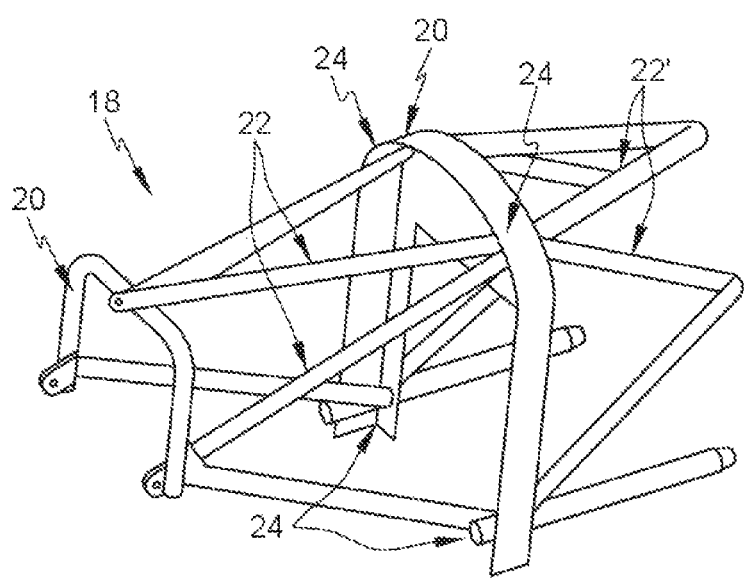
FIG. 2 is a perspective view of a lattice structure depicting one embodiment.
Figure 3:
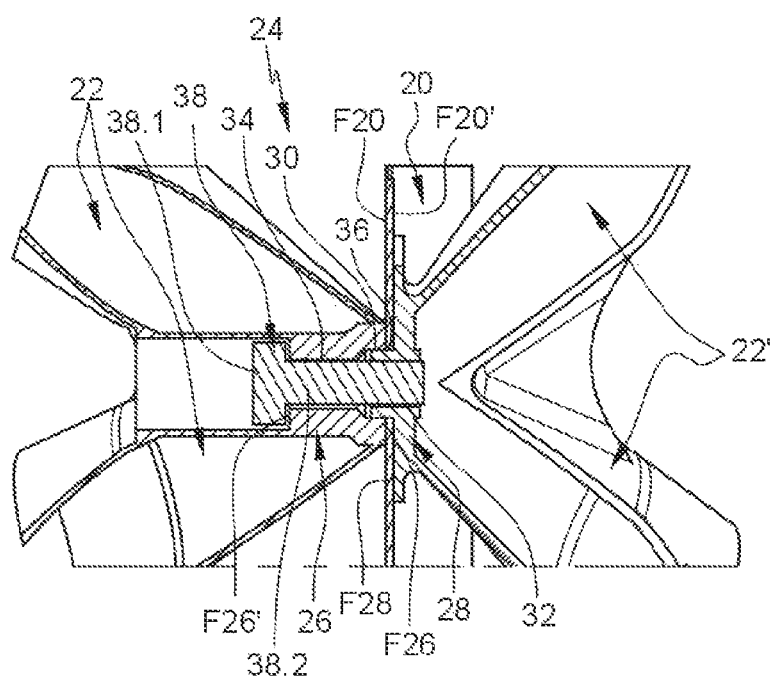
FIG. 3 is a cross section of a node of a lattice structure depicting one embodiment of the prior art.
Figure 4:
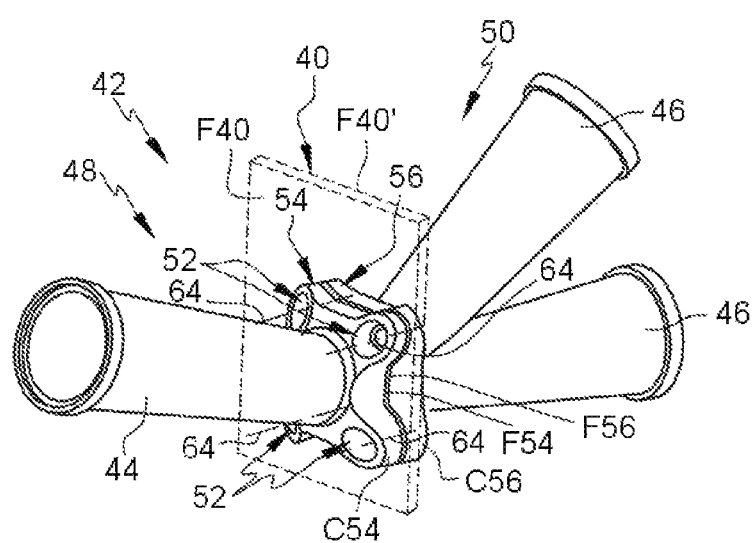
FIG. 4 is a perspective view of a node of a lattice structure depicting one embodiment of the invention.
Figure 5:
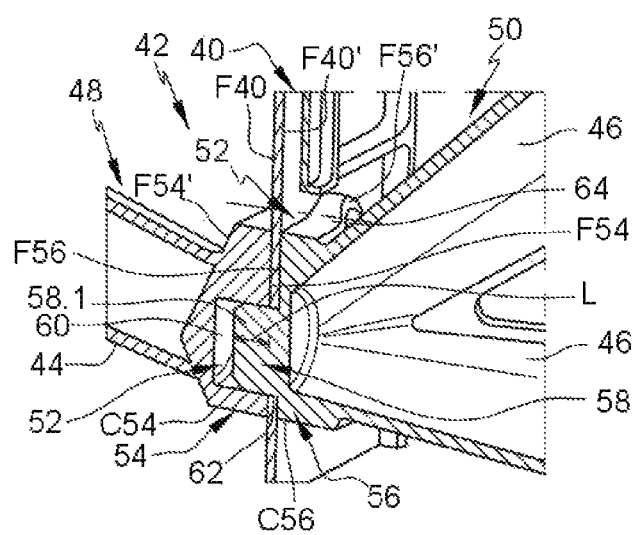
FIG. 5 is a cross section of a node of a lattice structure in accordance with an exemplary embodiment.

According to an exemplary embodiment shown in FIGS. 4 and 5, a node 42 comprises a portion of a first reinforcement 40 having opposite first and second faces F40, F40', an upstream part 48 positioned against the first face F40 of the first reinforcement 40 and comprising an end segment of at least one upstream reinforcement 44, a downstream part 50 positioned against the second face F40' of the first reinforcement 40 and comprising an end segment of at least one downstream reinforcement 46, and a connection system 52 passing through the first reinforcement 40 and connecting the upstream and downstream parts 48, 50.

According to one configuration, the first reinforcement 40 is a frame of the structure. According to this configuration, the portion of the first reinforcement 40 corresponds to a wall having a small thickness (dimension between the first and second faces F40, F40'). Of course, the invention is not limited to this configuration.

According to one arrangement, the first and second faces F40, F40' of the first reinforcement 40 are substantially flat and parallel to each other.

For the remainder of the description, a transverse plane is a plane substantially parallel to the first or second face F40, F40' of the first reinforcement 40. A longitudinal direction is a direction perpendicular to a transverse plane. A median plane is parallel to a transverse plane and equidistant from the first and second faces F40, F40' of the first reinforcement 40. In the case of a structure of an aircraft connecting a propulsion assembly to the aircraft, the longitudinal direction is substantially parallel to the axis of rotation of the engine of the propulsion assembly or to the thrust generated by the propulsion assembly. The terms "upstream" and "downstream" refer to the direction of flow of the air stream outside the aircraft, from upstream to downstream.

The upstream part 48 comprises a first plate 54 having a first surface F54 pressed against the first face F40 of the first reinforcement 40 and a second surface F54' opposite the first surface F54, the end segment of each upstream reinforcement 44 being connected to the first plate 54 at the second surface F54'. The first plate 54 has a first contour C54 connecting the first and second surfaces F54, F54'. The first surface F54 is not necessarily flat. It is shaped like the first face F40 of the first reinforcement 40 at the node 42 so that virtually the entire surface area of the first surface F54 is in contact with the first face F40 of the first reinforcement 40.

According to one configuration, the upstream part 48 comprises an end segment of a single upstream reinforcement 44, as depicted in FIGS. 4 and 5. According to another configuration, the upstream part 48 comprises end segments of two upstream reinforcements 44 forming a V, the tip of which is connected to the first plate 54.

The downstream part 50 comprises a second plate 56 having a first surface F56 pressed against the second face F40' of the first reinforcement 40 and a second surface F56' opposite the first surface F56, the end segment of each downstream reinforcement 46 being connected to the second plate 56 at the second surface F56'. The second plate 56 has a second contour C56 connecting the first and second surfaces F56, F56'. The first surface F56 is not necessarily flat. It is shaped like the second face F40' of the first reinforcement 40 at the node 42 so that virtually the entire surface area of the first surface F56 is in contact with the second face F40' of the first reinforcement 40.

According to one configuration, the downstream part 50 comprises an end segment of a single downstream reinforcement 46. According to another configuration visible in FIGS. 4 to 7, the downstream part 50 comprises end segments of two downstream reinforcements 46 forming a V, the tip of which is connected to the second plate 56.

According to an exemplary embodiment, the upstream and/or downstream reinforcements 44, 46 are tubular reinforcements. Of course, the invention is not limited to this embodiment for the upstream and/or downstream reinforcements 44, 46. The latter may be solid or hollow and have different cross sections that are round, cruciform, L-shaped or other.

According to one configuration, the first and second plates 54, 56 are substantially symmetrical with respect to the median plane.

The first and second contours C54, C56 of the first and second plates 54 and 56 are substantially identical. According to a first embodiment visible in FIGS. 4 and 6, the first and second contours C54, C56 describe approximately a square with rounded corners. According to a second embodiment visible in FIG. 7, the first and second contours C54, C56 describe approximately a triangle with rounded corners. Of course, the invention is not limited to these geometries for the first and second contours C54, C56.

The connection system 52 comprises at least one boss 58 protruding from the first surface F54, F56 of a first element from among the first or second plate 54, 56, a housing 60 for each boss 58, said housing being recessed relative to the first surface F54, F56 of a second element, different from the first element, from among the first or second plate 54, 56 and being configured to house the boss 58, and an orifice 62 passing through the first reinforcement 40 for each boss 58 in order to allow said boss to pass through the first reinforcement 40.

According to one arrangement visible in FIG. 5, the boss 58 is integral with the downstream part 50 and the housing 60 is provided at the upstream part 48.

The boss 58 and the housing 60 have cross sections adjusted so that the first and second plates 54, 56 are immobilized relative to each other in a plane parallel to the median plane or to the first or second face F40, F40' of the first reinforcement 40.

According to one embodiment, the boss 58 has a substantially circular cross section (parallel to the median plane). In addition, the housing 60 also has a circular cross section with a diameter substantially equal to that of the boss 58. Of course, the invention is not limited to this geometry for the cross sections of the boss 58 and the housing 60. Regardless of the embodiment, the boss 58 has constant cross sections in transverse planes (parallel to the first or second face F40, F40' of the first reinforcement 40).

According to one configuration, the orifice 62 passing through the first reinforcement 40 has a cross section adjusted to that of the boss 58 so that the upstream part 48 is immobilized relative to the first reinforcement 40 in a plane parallel to the median plane. When the boss 58 has a circular cross section, the orifice 62 also has a circular cross section with a diameter substantially equal to that of the boss 58.

According to another configuration, the orifice 62 has a cross section larger than that of the boss 58 so that a clearance remains between the boss 58 and the orifice 62.

The first reinforcement 40, the boss 58, and the housing 60 are configured so that the boss 58 comprises a segment 58.1 which is positioned in the housing 60 and has a length L (dimension measured in the longitudinal direction) greater than 0.25 times and preferably greater than 0.5 times the diameter of the boss 58. This configuration ensures better reaction of transverse forces (shear forces).

The connection system 52 also comprises at least one fastening element 64 passing through the first reinforcement 40 and connecting the first and second plates 54, 56 so as to hold them pressed against the first reinforcement 40. According to one feature, each fastening element 64 is spaced apart from the boss 58 and does not interfere therewith. Insofar as the fastening element 64 is offset in relation to the boss 58, with an equivalent cross section, the boss 58 has a diameter smaller than that of a boss of the prior art since it is not passed through by a tapped hole. In this way, the other elements of the node 42, in particular the first and second plates 54, 56, have dimensions smaller than those of the nodes of the prior art, resulting in a lighter and less costly structure with equivalent mechanical strength compared to a structure of the prior art.

Each fastening element 64 has a shank 64.1 passing through at least the first reinforcement 40 and oriented parallel to the longitudinal direction or perpendicular to the first or second face F40, F40' of the first reinforcement 40.

The connection system 52 comprises a plurality of fastening elements 64 evenly distributed around the boss 58.

For each fastening element 64, the first reinforcement 40 and the first and second plates 54, 56 each comprise a through hole 66 for housing the shank 64.1 of the fastening element 64.

According to a first configuration, each fastening element 64 is a bolt and the through holes 66 in the first and second plates 54, 56 are smooth.

According to a second configuration, each fastening element 64 is a screw, the through hole of a first element from among the first or second plate 54, 56 being smooth, the through hole of a second element, different from the first element, from among the first or second plate 54, 56 being tapped and configured to allow the screw to be screwed in.

Regardless of the configuration, each fastening element 64 has a shank 64.1 configured to ensure optimal reaction of the tensile forces. Moreover, the shank 64.1 and at least one smooth through hole housing it are dimensioned so that a clearance remains between the shank 64.1 and the smooth through hole so that the shank 64.1 does not react shear forces.

Figure 6:
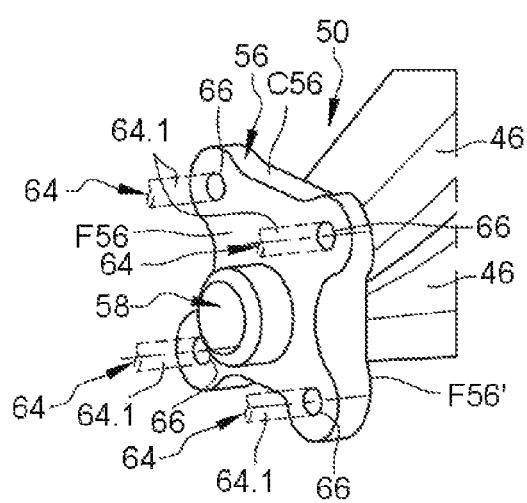
FIG. 6 is a perspective view of part of a node of a lattice structure according to an exemplary embodiment.
Figure 7:
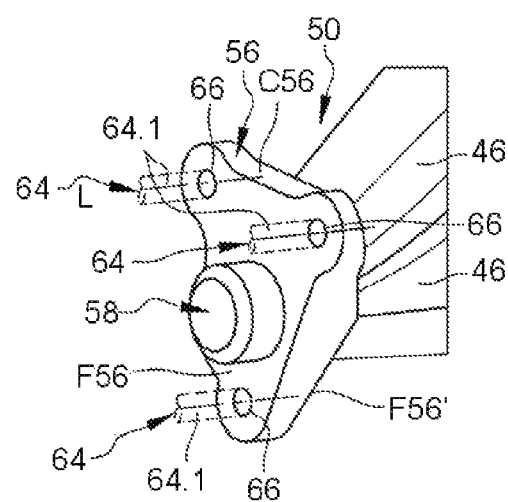
FIG. 7 is a perspective view of part of a node of a lattice structure according to an exemplary embodiment.

According to one arrangement, the connection system 52 comprises as many fastening elements 64 as the number of corners of the first and second contours C54, C56 of the first and second plates 54, 56. As illustrated in FIG. 6, the connection system 52 comprises four fastening elements 64 when the first and second contours C54, 56 describe substantially a square. As illustrated in FIG. 7, the connection system 52 comprises three fastening elements 64 when the first and second contours C54, C56 describe substantially a triangle. Regardless of the embodiment, the first and second contours C54, C56 of the first and second plates 54, 56 have a protrusion for each fastening element, such as vertices in the case of a polygonal contour, for example.

Regardless of the configuration, tightening the fastening elements 64 enables the first and second plates 54, 56 to be pressed against the first reinforcement 40 on either side thereof. The number and cross section of the fastening elements 64 are determined so that they ensure in particular the transmission of forces in the longitudinal direction between the upstream and downstream parts 48, 50. In the event that a fastening element 64 breaks or is lost, the other fastening elements compensate. Thus, a "fail-safe" system is obtained.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structure having at least one reinforcement of an aircraft, at least one node positioned on a first reinforcement of the at least one reinforcement, the first reinforcement having first and second opposite faces, at least one upstream reinforcement and at least one downstream reinforcement of the at least one reinforcement which are positioned on either of two sides of the first reinforcement and converge towards the node, the node comprising:
- a first plate having a first surface, pressed against the first face of the first reinforcement, to which the upstream reinforcement is connected,
- a second plate having a first surface, pressed against the second face of the first reinforcement, to which the downstream reinforcement is connected,
- a connection system comprising:
  - at least one boss protruding from the first surface of a first element from among the first or second plate,
  - for each boss, a housing recessed relative to the first surface of a second element, different from the first element, from among the first or second plate, the housing being configured to house the boss,
  - an orifice passing through the first reinforcement for each boss,
  - at least one fastening element passing through the first reinforcement and connecting the first and second plates,
  - wherein each fastening element is spaced apart from the boss, the first and second plates each further comprise identical first and second contours, and the first and second contours of the first and second plates each have a protrusion for each fastening element.

2. The structure according to claim 1, wherein the at least one fastening element comprises a plurality of fastening elements evenly distributed around the boss.

3. The structure according to claim 1, wherein the boss and the housing have cross sections adjusted so that the first and second plates are immobilized relative to each other in a plane parallel to the first or second face of the first reinforcement.

4. The structure according to claim 1, wherein the first reinforcement, the boss, and the housing are configured so that the boss comprises a segment which is positioned in the housing and has a length greater than 0.25 times the diameter of the boss.

5. The structure according to claim 1, wherein each fastening element has a shank passing through at least the first reinforcement and oriented perpendicularly to the first or second face of the first reinforcement.

6. The structure according to claim 5, wherein the shank and at least one smooth through hole housing the shank are dimensioned so that a clearance remains between the shank and the smooth through hole.

7. The structure according to claim 1, wherein the boss comprises constant cross sections in planes parallel to the first or second face of the first reinforcement.

8. An aircraft comprising at least one propulsion assembly, at least one support, and the structure according to claim 1 connecting the propulsion assembly and the support.

* * * * *